United States Patent [19]
Knebl et al.

[11] Patent Number: 4,724,150
[45] Date of Patent: Feb. 9, 1988

[54] MOIST CHEWING GUM COMPOSITION

[75] Inventors: Leslie F. Knebl, Morristown, N.J.; Ramola Lewis, Willowdale; Y. Fred Wen, Scarborough, both of Canada

[73] Assignee: Warner-Lambert Company, Morris Plains, N.J.

[21] Appl. No.: 874,246

[22] Filed: Jun. 13, 1986

[30] Foreign Application Priority Data

Jun. 28, 1985 [CA] Canada .................................. 485937

[51] Int. Cl.$^4$ ............................................. H23G 3/30
[52] U.S. Cl. ............................................. 426/3; 426/61
[58] Field of Search ................................. 426/3–6, 426/48, 61; 424/48

[56] References Cited

U.S. PATENT DOCUMENTS 2,891,868  6/1959  Heggie et al. ............................. 426/4
3,194,738  7/1965  Harrison et al. .......................... 426/3
3,235,460  2/1966  Ennever .................................... 426/3
4,178,362  12/1979  Hoogendoorn et al. ................ 426/3
4,271,198  6/1981  Cheruhuri et al. ....................... 426/3
4,479,969  10/1984  Bakal et al. ............................... 426/3

*Primary Examiner*—Jeanette Hunter
*Attorney, Agent, or Firm*—Charles A. Gaglia, Jr.; Gary M. Nath

[57] ABSTRACT

Moist chewing gum composition comprising gum base, solid sweetener and liquid sweetener, about 10 to about 35% sucrose fondant and about 0.05 and 1.5 D.C.L. units sucrose inverting enzyme dissolved in a mobile carrier per 100 g of the composition. The composition has an initially firm texture convenient for processing and packaging, and develops and retains a soft moist texture as a result of inversion of sucrose dissolved in the liquid phase of the fondant to produce the humectant sugars glucose and fructose.

23 Claims, No Drawings

MOIST CHEWING GUM COMPOSITION

On storage, known moist chewing gum compositions lose at least part of their initial content of moisture through evaporation into the atmosphere, and eventually acquire a dry, hard texture which is unappealing to the consumer.

It is possible to provide the composition with an initially higher moisture content, for example by incorporating in the composition a higher proportion of the liquid sweetener solutions usually forming an ingredient of the composition, but this imparts a sticky texture to the gum which renders it difficult to process and package.

Further, loss of moisture can be delayed or prevented by packaging the gum in hermetically sealed packaging materials, but these are expensive, and may present problems of inconvenience of unpackaging or unwrapping for retailers and consumers.

The present invention provides compositions which may be formulated to provide an initially firm texture which is convenient for processing and packaging, and which develops and maintains a soft, moist texture on storage, and whereby loss of soft texture and moisture may be considerably delayed or prevented over normal shelf lives, without requiring hermetically closed packaging.

In the present compositions, a portion of the mixture of solid and liquid sweeteners usually employed in gum compositions is replaced by a sucrose fondant, and a quantity of sucrose inverting enzyme dissolved in a mobile carrier is blended into the gum. By "sucrose inverting enzyme" is meant an enzyme which hydrolyzes sucrose to invert sugar (a mixture of glucose and fructose). At least two such enzymes are known, namely $\beta$-h-fructosidase and $\alpha$-n-glucosido invertase. Mixtures of these enzymes are available commercially in liquid form as "Invertase Concentrate" and the enzymes are often designated "invertase" among those skilled in the art. Since, however, the term "invertase" may be considered somewhat indefinite, the term "sucrose inverting enzyme" will be used herein.

We have found that on mixing sucrose inverting enzyme with gum compositions containing no sucrose fondant, and with usual moisture contents, there is no detectable softening of the composition.

We have further found that up to about 35% by weight of sucrose fondant, based on the total weight of the composition, may be included in chewing gum compositions without imparting a sticky texture to the compositions. Preferably the weight of the sucrose fondant is about 15% to about 30% of the total composition.

Sucrose fondants consist of a solid phase consisting of micron-size solid sucrose crystals and a liquid aqueous phase containing dissolved sucrose and dissolved humectant sugar solids. These fondants can be prepared in such manner as to have a liquid phase having a content of total dissolved solids of about 65 to about 75% based on the weight of the liquid phase and hence having a moisture content of about 25 to about 35% based on the weight of the liquid phase, this liquid phase being in stable equilibrium with the solid phase at any given temperature, and not tending to dissolve sucrose from the solid phase unless the temperature is elevated. We have found that by blending such fondants and sucrose inverting enzyme in mobile liquid form with chewing gum ingredients, a gum composition can be obtained which initially has a firm texture suitable for forming and packaging on conventional machinery. On storage at normal temperatures, the texture of the gum softens and its texture remains soft during storage at normal temperatures and over the usual shelf life of the product.

Without wishing to be bound by any theory, it is suggested that, on blending the fondant with the gum ingredients, inclusions of the liquid phase of the fondant are formed in the gum composition, into which the mobile liquid sucrose inverting enzyme penetrates. It is known that the activity of the enzyme is dependent on the moisture content of its environment, and that its activity more or less ceases in syrups with a moisture content of less than about 18% based on the weight of the syrup and a content of dissolved sugar solids of greater than about 82% based on the weight of the syrup. Thus, in the inclusions of fondant liquid phase having a moisture content of at least about 25% based on the weight of the liquid phase, the enzyme can invert the dissolved sucrose to form glucose and fructose, which are humectant sugars and thus tend to attract and retain moisture within the gum composition, so that the composition achieves and maintains a soft, moist texture. The removal of sucrose from the liquid phase through inversion disturbs the equilibrium between the liquid and solid phases of the fondant, and permits further sucrose to dissolve in the liquid phase, which will then also undergo inversion. The processes of inversion and dissolution will continue until the total dissolved solids in the liquid phase reach the level at which the activity of the enzyme is inhibited.

Accordingly the invention provides a process for forming a chewing gum composition comprising blending together at a temperature less than about 70° C., in the following proportions by weight, based on the total weight of the composition:

(a) about 10 to about 40% gum base;
(b) about 20 to about 75% solid sweetener having its particle size in the range 90 to 250 microns;
(c) about 5 to about 30% liquid sweetener solution consisting of, based on the weight of the solution, about 60 to about 90% humectant sugar solids and about 10 to about 30% moisture;
(d) about 10 to about 35% sucrose fondant consisting of, based on the weight of the fondant, about 35 to 80% crystalline sucrose having its particle size in the range 10 to 30 micron, about 5 to about 40% humectant sugar solids, and about 10 to about 15% moisture, and said fondant comprising a liquid phase comprising about 25 to about 35% moisture based on the weight of the liquid phase and about 65 to 75% dissolved solids based on the weight of the liquid phase; and
(e) about 0.05 to about 1.5 D.C.L. units sucrose inverting enzyme dissolved in a mobile carrier per 100 g of the chewing gum composition.

The invention includes the novel blended compositions which result from carrying out the above process. As will be appreciated from the above, such blended compositions can have a non-sticky, soft texture which can be preserved during prolonged storage. Owing to the presence of sucrose fondant in the compositions, the compositions are characterised by the presence of substantial amounts of finely crystalline sucrose having its particle size in the range 10 to 30 micron, as well as by the presence of sucrose inverting enzyme, since such finely crystalline sucrose is found in sucrose fondants. The invention thus further provides: a chewing gum composition comprising in blended admixture; based on the total weight of the composition, about 10 to about 40% gum base, about 20 to about 75% solid sweetener having its particle size in the range 90 to 250 micron, about 3 to about 25% crystalline sucrose having its particle size in the range 10 to 30 micron, about 4 to about 45% humectant sugar, calculated on a dry solids basis, about 2 to about 10% moisture, and about 0.05 to about 1.5 D.C.L. units sucrose inverting enzyme per 100 g of the composition.

Gum bases of the types conventionally employed in chewing gum and bubble gum compositions may be employed. Examples include any of the water-insoluble gum bases well known in the art. Illustrative examples of suitable polymers in gum bases include both natural and synthetic elastomers and rubbers. For example, those polymers which are suitable in gum bases, include, without limitation, substances of vegetable origin such as chicle, jelutong, gutta percha and crown gum. Synthetic elastomers such as butadiene-styrene copolymers, isobutylene-isoprene copolymers, polyethylene, polyisobutylene, polyvinylacetate and mixtures thereof, are particularly useful.

The gum base may contain elastomer solvents to aid in softening the rubber component. Such elastomer solvents may comprise methyl, glycerol or pentaerythritol esters of rosins or modified rosins, such as hydrogenated, dimerized or polymerized rosins or mixtures thereof. Examples of elastomer solvents suitable for use herein include the pentaerythritol ester of partially hydrogenated wood rosin, pentaerythritol ester of wood rosin, glycerol ester of partially dimerized rosin, glycerol ester of polymerized rosin, glycerol ester of tall oil rosin, glycerol ester of wood rosin and partially hydrogenated wood rosin and partially hydrogenated methyl ester of rosin, such as polymers of $\alpha$-pinene or $\beta$-pinene; terpene resins including polyterpene and mixtures thereof. The solvent may be employed in an amount ranging from about 2% to about 20% and preferably about 5% to about 15% by weight of the gum base.

A variety of traditional ingredients such as plasticizers or softeners including lanolin, stearic acid, sodium stearate, potassium stearate, glyceryl triacetate, glycerine and the like, for example, natural waxes, petroleum waxes, such as polyethylene waxes, paraffin waxes and microcrystalline waxes may also be incorporated into the gum base to obtain a final gum base having a variety of desirable textures and consistency properties. These individual additional materials are generally employed in amounts of up to about 30% by weight and preferably in amounts of from about 3% to about 20% by weight of the final gum base.

The gum base may further include conventional additives such as lubricants, anti-stick agents, etc. As noted above, the composition should comprise about 10 to about 40% of gum base. With contents of the gum base less than about 10%, the composition tends to lack adequate chewiness, while compositions containing more than about 40% by weight of the gum base tend to be excessively stiff and hard. More preferably, the content of chewing gum base is about 12 to about 35% by weight.

In order to provide the composition with a desired non-sticky texture, it should comprise at least about 20% by weight solid sweetener having its particle size in the range 90 to 250 micron. Contents of solid sweetener of less than about 20% tend to produce compositions which have a moist sticky texture, which render them difficult to process on conventional handling and packaging machinery. The content of the solid sweetener should be no greater than about 75% by weight, as with increasing contents of the solid sweetener, the composition tends to acquire a drier, harder texture. Preferably, the content of the solid sweetener is about 25 to about 60% by weight of the composition. Although the presence of minor amounts of solid sweetener having its particle size outside the range 90 to 250 microns can be tolerated, desirably these comprise no more than about 10%, more preferably no more than about 5% of the weight of solid sweetener having its particle size within the said range. Owing to problems of ignition of conventional solid sweeteners on extremely fine size reduction, even the most finely divided solid sweeteners, as commercially available, contain no more than about 10% of their weight having a particle size below 90 microns. The presence of amounts of solid sweetener having a particle size above about 250 microns tends to impart a gritty texture to the final composition, and is undesirable. As examples of suitable solid sweeteners may be mentioned a wide range of materials such as water-soluble sweetening agents, water-soluble artificial sweeteners, and dipeptide based sweeteners, including mixtures thereof. Without being limited to particular sweeteners, representative illustrations encompass:

A. Water-soluble sweetening agents such as monosaccharides, disaccharides and polysaccharides such as xylose, ribose, mannose, galactose, sucrose, maltose, and sugar alcohols such as sorbitol, xylitol, mannitol and mixtures thereof.

B. Water-soluble artificial sweeteners such as the soluble saccharin salts, i.e. sodium or calcium saccharin salts, cyclamate salts and the like, and the free acid form of saccharin.

C. Dipeptide based sweeteners include L-aspartyl-L-phenylalanine methyl ester and materials described in U.S. Pat. No. 3,492,131 and the like.

The sweeteners falling within categories B and C above will usually be used in amounts of about 0.005 to about 5% by weight based on the total weight of the composition, and will therefore usually be employed in combination with a category A sweetening agent.

Examples of further solid sweeteners that may be employed include dihydrochalcone compounds, glycyrrhizin, *Stevia rebaudiana* (Stevioside), and 3,6-dihydro-6-methyl-1,2,3-oxathiazin-4-one-2,2-dioxide, particularly the potassium (Acesulfane-K), sodium and calcium salts thereof as described in German Pat. No. 2,001,017.7. Mixtures of the above solid sweeteners may of course be employed. By reason of its cheapness, ready availability in finely-powdered form, and wide acceptance in chewing gum compositions, sucrose is preferred as the solid sweetener.

In order to provide the composition with an adequately soft and moist texture, the composition should comprise, based on the weight of the composition, at least about 10% sucrose fondant and at least about 5% of a liquid sweetener solution consisting of an aqueous solution of a humectant sugar i.e. a sugar which has affinity for and binds water, and exerts a stabilizing action on the moisture content of compositions in which it is included. Such liquid sweeteners are conventionally employed in moist chewing gum compositions in order to impart to the composition a soft, moist character and to tend to preserve at least a minimum moisture content in the composition when exposed to fluctuating relative humidities. Examples of humectant sugars, syrups of which can be employed as the liquid sweetener include glucose, starch hydrolysates, fructose, and mixtures thereof, for example invert sugar and high fructose corn syrup. The gum composition's content of liquid sweetener solution should not be more than about 30% by weight, based on the weight of the gum composition, since higher contents of liquid sweetener solution tend to impart a sticky character to the composition. Preferably, the content of liquid sweetener solution is about 10 to about 25% by weight of the gum composition. The liquid sweetener solution may contain up to about 90%, based on the weight of the liquid sweetener solution, of dissolved humectant sugar solids. The liquid sweetener solution should contain at least about 60%, based on the weight of the liquid sweetener solution, of dissolved humectant sugar solids and should thus contain about 10 to about 40% moisture, based on the weight of the liquid sweetener solution.

If the liquid sweetener solution contains greater than about 40% moisture, it tends to contain excess free moisture, not bound to the humectant sugar, which will tend to dissolve the solid sweetener present in the composition, and impart a sticky character to the composition.

Generally, it is desirable for the gum composition to contain no more than about 10% moisture, based on the total weight of the composition. Gum compositions with greater moisture contents tend to be excessively moist and sticky and are difficult to handle and wrap. Accordingly the quantity of liquid sweetener employed, and/or its moisture content, is generally selected so that the total moisture content of the blended composition, based on the total weight of the composition, is no more than about 10%.

The gum composition may comprise up to about 35% of the sucrose fondant based on the weight of the gum composition. If higher contents of the fondant are employed, we have found that the gum composition tends to acquire an amorphous, fudge-like or grainy texture. As noted above, the composition should comprise at least about 10% by weight of the fondant in order to yield in the composition, on partial inversion of the sucrose during storage, a content of the humectant glucose and fructose sugars which will attract and retain moisture in the gum composition. Preferably, the amount of sucrose fondant employed is about 15 to about 30% by weight of the composition.

Suitable sucrose fondants are readily commercially available, as confectioners fondant, or may be prepared by dissolving in water about 40 to about 80 parts by weight sucrose and about 60 to about 20 parts by weight (including its moisture) of humectant sugar syrup, e.g. glucose syrup, and cooking the mixture to produce a mixed solution of sucrose and humectant sugar with a moisture content of usually about 10 to about 15% based on the total weight of the cooked mixture. The higher the temperature to which the mixture is cooked, the lower is the moisture content of the eventual product. The cooked mixture is then cooled rapidly to about 60° C. while being agitated, preferably under conditions of high shear. On cooling, the mixed solution becomes supersaturated. Part of the dissolved sucrose crystallizes out from the supersaturated solution in the form of minute crystals of 10 to 30 microns particle size, leaving an aqueous liquid phase containing the humectant sugar and the remainder of the sucrose. Depending on the proportions of sucrose and humectant sugar used, and the temperature to which the mixture is cooked before cooling, the liquid phase contains a total of about 65 to about 75% by weight dissolved solids, based on the weight of the liquid phase, and about 25 to about 35% moisture, thus providing a liquid phase with a sufficient content of moisture (above 18%) within which the sucrose inverting enzyme is capable of exerting its enzymatic activity. The fondant may contain small quantities of sucrose crystals of less than 10 microns size. The presence in the fondant of substantial contents of sucrose crystals with a particle size greater than about 30 microns indicates an undesired degree of non-uniformity of the fondant material. Accordingly, the fondants employed preferably contain no more than about 10%, more preferably no more than about 5% by weight of sucrose crystals of particle size outside the range 10 to 30 microns, based on the total weight of sucrose crystals present in the fondant.

The fondant preferably contains a weight ratio of sucrose to humectant sugar (dry solids basis) in the range about 1:1 to about 20:1. The use of less than about 1 part by weight sucrose per part of humectant sugar solids tends to produce a fondant which has an excessively moist and sticky character, and a relatively low content of crystalline sucrose, which, when incorporated into the gum composition, imparts an excessively moist, sticky character to the gum, and presents problems in processing and packaging of the gum. The use of greater than about 20 parts sucrose per part humectant sugar solids tends to produce problems during the preparation of the fondant. The humectant sugar serves the function of inhibiting the crystallization of the sucrose during cooking, and, with relatively low contents of humectant sugar, it is difficult to achieve the required supersaturated solution of sucrose, and unwanted premature crystallization of the sucrose may occur. More preferably, the weight ratio of sucrose to humectant sugar is in the range about 2:1 to about 15:1.

The gum composition will thus contain a total content of humectant sugar, calculated on dry solids basis, of about 4 to about 45% based on the weight of the gum composition, more preferably about 8 to about 35%, and a total moisture of about 2 to about 10% by weight based on the weight of the gum composition, more preferably about 3 to about 8% by weight, derived from the liquid sweetener and from the fondant material incorporated into the gum composition.

The gum composition should comprise at least about 0.05 D.C.L. units sucrose inverting enzyme per 100 g of the composition, in order to provide sufficient enzymatic activity to invert an appreciable quantity of the sucrose present in the gum composition to fructose and glucose. Contents of more than about 1.5 D.C.L. units of the enzyme per 100 g of the composition are unnecessary, and merely add to the costs of manufacture. Preferably, the enzyme is employed in an amount of from about 0.1 to about 0.3 D.C.L. units per 100 g. The term "D.C.L. units" refers to the standard method for determining enzymatic activity of sucrose inverting enzyme-containing materials. 1 ml of an enzyme containing material is considered to contain 8.0 D.C.L. units when it extinguishes the optical rotation of 100 g of sucrose dissolved in 1 l of 0.1 molar sodium dihydrogen orthophosphate at a pH of 4.6 and at a temperature of 38° C. in 45 minutes. If larger or smaller volumes of the enzyme-containing material are required, the activity expressed in D.C.L. units is considered to differ in proportion.

The preferred mobile carrier for the enzyme is a mixture of water and glycerine. The enzyme is readily dissolvable in these mixtures, and the glycerine has a neutral or slightly sweet taste, which does not impart any undesired taste to the gum composition. Other mobile liquids in which the enzyme is soluble and which are compatible with the enzyme may of course be employed. An example of a suitable enzyme containing material is that available from MLG Enterprises, P.O. Box 195, Clarkson Post Office, Mississauga, Ontario, Canada, L5J 3Y1 under designation Invertase Concentrate I, which is a solution of the sucrose-inverting enzyme in a 55% glycerine:45% water mixture. The enzymatic activity of this material is 8.0 D.C.L. unit/ml.

The chewing gum composition of this invention may include the conventional additives of flavoring agents, coloring agents such as titanium dioxide; emulsifiers such as lecithin and glycerol monostearate; and additional fillers such as aluminum hydroxide, alumina, aluminum silicates, calcium carbonate, and talc and combinations thereof. Preferably the amount of fillers when used will vary from about 4% to about 30% by weight of the chewing gum composition.

Suitable flavoring agents include both natural and artificial flavors, and mints such as spearmint or peppermint, menthol, oil of wintergreen (methyl salicylate), artificial vanilla, cinnamon, various fruit flavors, such as citrus oils including lemon, orange, grape, lime and grapefruit, and fruit essences such as apple, strawberry, cherry, pineapple and so forth, both individual and mixed, and the like are contemplated. The flavoring agents are generally utilized in amounts that will vary depending upon the individual flavor, and may, for example, range in amounts of about 0.5% to about 3% by weight of the final chewing gum composition weight. The coloring agents useful in the present compositions include the pigments such as titanium dioxide, that may be incorporated in amounts of up to about 1% by weight, and preferably up to about 0.6% by weight. Also, the colorants may include other dyes suitable for food, drug and cosmetic applications, and known as F.D. & C. dyes and the like. The materials acceptable for the foregoing spectrum of use are preferably water-soluble. Illustrative examples include indigoid dye, known as F.D. & C. Blue No. 2, which is the disodium salt of 5,5'-indigotindisulfonic acid. Similarly, the dye known as F.D. & C. Green No. 1, comprises a triphenyl-methane dye and is the monosodium salt of 4-[4-N-ethyl-p-sulfobenzylamino)diphenylmethylene]-[1-(N-ethyl-N-p-sulfoniumbenzyl)-2,5-cyclohexadienimine]. A full recitation of all F.D. & C. dyes and their corresponding chemical structures may be found in the Kirk-Othmer Encyclopedia of Chemical Technology, in Volume 5, at pages 857–884, to which reference may be made.

The chewing gums of the invention may be manufactured in any form known in the art, such as stick gum, slab gum, chunk gum, pillow gum, shredded gum, hard coated gum, tabletted gum, as well as center-filled gum.

The compositions in accordance with the invention may be prepared by, for example, melting the gum base, typically at about 85° C. to 95° C., cooling it, e.g. to about 78° C., and placing it in a prewarmed (e.g. 60° C.) standard mixing kettle equipped with sigma blades. The liquid sweetener and fondant are then added and mixed into the gum base. The solid sweetener, and any desired additives such as colour and flavour, may be added and mixed in to achieve a uniform blend. The mixing vessel is cooled and the mobile liquid carrier containing sucrose inverting enzyme is then added to the cooled blend and mixed in until it is well dispersed within the composition. The gum compositions thus obtained have a firm texture which persists for a period sufficient to permit the composition to be subjected to conventional gum forming and wrapping procedures, for example by discharging the composition from the kettle, rolling it, scoring it and forming it into chewing gum pieces which are then wrapped. Typically, the texture of the gum softens appreciably after about 24 hours following the initial mixing of the composition, and its texture remains soft during storage periods and during the normal shelf life of the product, which may extend for periods of up to about 2 or 3 months. Typically, over a period of about 2 to 3 months from the initial mixing of the composition, about 3 to about 5% of the sucrose present in the starting material fondant will be inverted.

It is known that sucrose inverting enzyme tends to be inactivated at elevated temperatures and pHs. The ingredients of the composition are desirably therefore, as will be the case with conventional gum composition ingredients, free from any content of bases which will elevate the pH above about 7, at which the enzyme activity more or less ceases. The enzyme is added while the other ingredients are at a temperature which imparts sufficient pliability to the gum base material to permit this to be blended with the enzyme and its carrier, but which is low enough to avoid substantial inactivation of the enzyme. Desirably, the ingredients are at a temperature in the range of about 5 to about 70° C., more preferably about 8° C. to about 60° C. when the enzyme is added.

All percentages herein are by weight based on the total weight of the composition unless otherwise indicated.

Examples of compositions in accordance with the invention will now be given.

EXAMPLE 1

A chewing gum was prepared from the following ingredients.

|  | Parts by Weight |
|---|---|
| Gum base Type 2 LFC[a] | 20 |
| Powdered sucrose (of which 95% was of particle size greater than 90 microns and less than 200 microns) | 45 |
| Liquid glucose (80% solids) (DE = 42–44) | 15 |
| Confectioners fondant (88% solids)[b] | 20 |
| Invertase Concentrate I (ex MLG Enterprises) | 0.03 |
| Flavour[c] | 0.08 |
| Colour[d] | 0.02 |

Notes
[a] Obtained from Warner-Lambert (Ireland) Ltd.
[b] The confectioners fondant consisted of, by weight, sucrose 73%, corn syrup solids 15%, moisture 12%.
[c] The flavour was IFF - Grape ICC-26450.
[d] The colour was a mixture of F.D. & C. Blue No. 2 and F.D. & C. Red No. 2.

The gum base was melted at a temperature of 90° C. and placed in a standard dough mixer. The liquid glucose and fondant were added and mixed until uniformly blended into the gum base. The powdered sucrose, colour and flavour were then added and mixed until blended. The mixture was cooled to 38° C. and the liquid invertase concentrate was added and mixed until blended in.

The chewing gum composition thus prepared had a firm texture and was formed and wrapped on conventional forming and wrapping machinery. Its texture softened after 24 hours from mixing and forming, and its texture remains soft during prolonged storage.

EXAMPLE 2 AND COMPARATIVE EXAMPLES 1 AND 2

The ingredients listed in Table 1 below were blended together, in the parts by weight indicated, using the following procedure: the gum base was melted at 90° C. and the Atomite filler was mixed in; next the fondant was mixed in, followed by the glucose syrup and the powdered sucrose, the flavour and the colour. The mixture was then cooled until its temperature was in the range of 35° C. to 40° C. The invertase enzyme was then added and mixed until uniformly blended.

The three batches of bubble gum thus obtained were evaluated by panelists chewing the products and comparing their textures.

It will be noted that the composition of Comparative Example 2 is a conventional bubble gum composition, containing no sucrose fondant or sucrose inverting enzyme.

The composition of Comparative Example 1 was identical to that of Comparative Example 2 except it contained sucrose inverting enzyme.

The composition of Example 2 was identical to that of Comparative Examples 1 and 2 except about 20% by weight of the sugar, liquid glucose and caramel paste (based on the total weight of the sugar, liquid glucose and caramel paste) was replaced with confectioners fondant while maintaining the weight ratio of sucrose-liquid glucose-moisture at approximately the same value as in Comparative Example 1. In order to maintain the level of fat in the composition of Example 2 the same as that in Comparative Examples 1 and 2, a small amount of coconut oil was added to compensate for the reduced quantity of cottonseed oil present in the composition.

The results of the chewing panelists evaluation were as follows:

The products of Comparative Examples 1 and 2 were judged to have equally hard textures.

TABLE 1

| Ingredients | Parts by Weight | | |
|---|---|---|---|
| | Example 2 | Comparative Example 1 | Comparative Example 2 |
| Compound 2LFC[a] | 14.56 | 14.56 | 14.56 |
| Atomite Filler | 4.87 | 4.87 | 4.87 |
| Liquid Glucose 43 DE (solids content 82.7%) | 11.54 | 15.38 | 15.38 |
| Caramel Paste[b] | 1.46 | 1.95 | 1.95 |
| Powdered Sucrose (95% in the particle size range 90 to 200 microns) | 47.17 | 63.08 | 63.08 |
| Confectioners fondant[c] | 20.11 | — | — |
| Coconut Oil[d] | 0.13 | — | — |
| Invertase Concentrate I | 0.16 | 0.16 | — |

Notes
[a]Compound 2LFC is the gum base employed in Example 1.
[b]The caramel paste is used for the purpose of keeping the composition moist and consisted of a blend of glucose syrup, sucrose, hydrogenated cottonseed oil and water.
[c]The fondant consisted of a mixture of sucrose and glucose in a weight ratio of 4:1 (dry solids basis) and a moisture content of 12% based on the weight of the fondant.
[d]The coconut oil was obtained under the trade mark SINGLE OCO from Monarch Fine Foods Co. Ltd., Rexdale, Ontario, Canada.

The product of Example 2 was judged to have a soft moist texture.

These results show:

(a) the addition of sucrose inverting enzyme to a conventional chewing gum composition, containing no confectioners fondant, does not affect the texture of the composition; and (b) The inclusion of sucrose fondant and sucrose inverting enzyme achieves a composition with a soft moist texture.

The embodiments of the invention in which an exclusive property or privilege is claimed are defined as follows:

1. A chewing gum composition comprising in blended admixture, based on the total weight of the composition, about 10 to about 40% gum base, about 20 to about 75% solid sweetener having its particle size in the range 90 to 250 microns, about 5 to about 30% liquid sweetener solution consisting of, based on the weight of the solution, about 60 to 90% humectant sugar solids and about 10 to about 30% moisture, about 10 to about 35% sucrose fondant consisting of based on the weight of the fondant, about 35 to 80% crystalline sucrose having its particle size in the range 10 to 30 micron, about 5 to about 40% humectant sugar solids, and about 10 to about 15% moisture, and said fondant comprising a liquid phase comprising about 25 to about 35% moisture based on the weight of the liquid phase and about 65 to 75% dissolved solids based on the weight of the liquid phase, and about 0.05 to about 1.5 D.C.L. units sucrose inverting enzyme per 100 g of the composition.

2. Composition according to claim 1 containing about 12 to about 35% gum base.

3. Composition according to claim 1 containing about 25 to about 60% of said solid sweetener.

4. Composition according to claim 1, 2 or 3 wherein said solid sweetener is sucrose.

5. Composition according to claim 1 wherein the content of liquid sweetener solution is about 10 to about 25%.

6. Composition according to claim 1 wherein the content of sucrose fondant is about 15 to about 30%.

7. Composition according to claim 1, 2 or 6 wherein humectant sugar is one or more of glucose, fructose, and starch hydrolysates.

8. Composition according to claim 1 wherein the fondant contains a weight ratio of sucrose:humectant sugar solids of about 1:1 to about 20:1.

9. Composition according to claim 1 containing about 0.1 to about 0.3 D.C.L. units sucrose inverting enzyme per 100 g.

10. Composition according to claim 1 having a pH below about 7.

11. Process for forming a chewing gum composition comprising blending together at a temperature less than about 70° C., in the following proportions by weight, based on the total weight of the composition:

(a) about 10 to about 40% gum base;

(b) about 20 to about 75% solid sweetener having its particle size in the range 90 to 250 microns;

(c) about 5 to about 30% liquid sweetener solution consisting of, based on the weight of the solution, about 60 to about 90% humectant sugar solids and about 10 to about 30% moisture;

(d) about 10 to about 35% sucrose fondant consisting of, based on the weight of the fondant, about 35 to 80% crystalline sucrose having its particle size in the range 10 to 30 micron, about 5 to about 40% humectant sugar solids, and about 10 to about 15% moisture, and said fondant comprising a liquid phase comprising about 25 to about 35% moisture based on the weight of the liquid phase and about 65 to 75% dissolved solids based on the weight of the liquid phase; and (e) about 0.05 to about 1.5 DCL units sucrose inverting enzyme dissolved in a mobile carrier per 100 g of the chewing gum composition.

12. Process according to claim 11 wherein the content of gum base is about 12 to about 35%.

13. Process according to claim 11 wherein the content of said solid sweetener is about 25 to about 60%.

14. Process according to claim 13 wherein said solid sweetener is sucrose.

15. Process according to claim 11 wherein the content of liquid sweetener solution is about 10 to about 25%.

16. Process according to claim 11 wherein the content of sucrose fondant is about 15 to about 30%.

17. Process according to claim 11 wherein the fondant contains a weight ratio of sucrose:humectant sugar solids of about 1:1 to about 20:1.

18. Process according to claim 17 wherein said ratio is about 2:1 to about 15:1.

19. Process according to claim 11 wherein said mobile carrier comprises a mixture of glycerin and water.

20. Process according to claim 11 wherein the content of sucrose inverting enzyme is about 0.1 to about 0.3 D.C.L. units per 100 g.

21. Process according to claim 11 wherein the blending is carried out at a temperature of from about 5 to about 70° C.

22. Process according to claim 21 wherein the temperature is about 8° to about 60° C.

23. Process according to claim 11 wherein the composition has a pH below about 7.

* * * * *